United States Patent [19]
Luchetti et al.

[11] Patent Number: 5,743,054
[45] Date of Patent: Apr. 28, 1998

[54] MODULAR UTILITIES COVER

[75] Inventors: Robert J. Luchetti; Anne C. Ackerly, both of Cambridge, Mass.; James D. Houda, Grand Rapids, Mich.; Steven Imrich, Cambridge, Mass.; Michael E. Miles, Grand Rapids, Mich.

[73] Assignee: Steelcase Inc., Grand Rapids, Mich.

[21] Appl. No.: 628,992

[22] Filed: Apr. 10, 1996

Related U.S. Application Data

[63] Continuation-in-part of Ser. No. 367,804, Dec. 30, 1994.
[51] Int. Cl.⁶ ............................................. E04F 19/04
[52] U.S. Cl. ............................... 52/220.7; 52/238.1
[58] Field of Search ......................... 52/28, 39, 220.6, 52/220.7, 220.8, 238.1

[56] References Cited

U.S. PATENT DOCUMENTS

| | | | |
|---|---|---|---|
| Re. 25,628 | 8/1964 | Kruger | 240/9 |
| 2,159,296 | 5/1939 | Sharp | 52/220.7 X |
| 2,569,916 | 10/1951 | Barnes, Sr. et al. | 189/85 |
| 3,359,697 | 12/1967 | Smith et al. | 52/28 X |
| 3,655,961 | 4/1972 | Hover | 240/9 A |
| 3,725,568 | 4/1973 | Stanley | 174/48 |
| 3,835,606 | 9/1974 | Liberman | 52/220.6 |
| 3,848,385 | 11/1974 | Thompson | 52/475 |
| 3,911,639 | 10/1975 | Rachlin et al. | 52/220.6 |
| 4,175,360 | 11/1979 | Mulvey | 52/28 |
| 4,377,059 | 3/1983 | Kuhr | 52/220.6 X |
| 4,549,375 | 10/1985 | Nassof | 52/39 |
| 5,263,290 | 11/1993 | Gardner | 52/220.6 |

FOREIGN PATENT DOCUMENTS

| | | | |
|---|---|---|---|
| 43299 | 12/1973 | Australia | 52/39 |

*Primary Examiner*—Michael Safavi
*Attorney, Agent, or Firm*—Price, Heneveld, Cooper, DeWitt & Litton

[57] ABSTRACT

A demountable overhead utility cover unit is provided for use in a building room having a generally open plan for the purpose of transitioning between ceilings of different heights. The units are assembled in an end-to-end fashion and may be disassembled to take to a new location. Each unit comprises a horizontal header having hanging brackets on a top surface, a vertical support structure attached to the header and depending therefrom, a horizontal trough attached to the bottom of the vertical support structure and adapted to abut a top surface of the wall panels of a demountable movable wall system, and a plurality of cover panels attached to the support structure and positioned between the header and trough. Each of the cover panels has a horizontally elongated front elevational shape and the panels are detachably attached to the vertical support structure. One of the cover panels is adapted to interface with a building ventilation duct and has a ventilation grate to facilitate the flow of ventilation air to an interior of the building room.

44 Claims, 7 Drawing Sheets

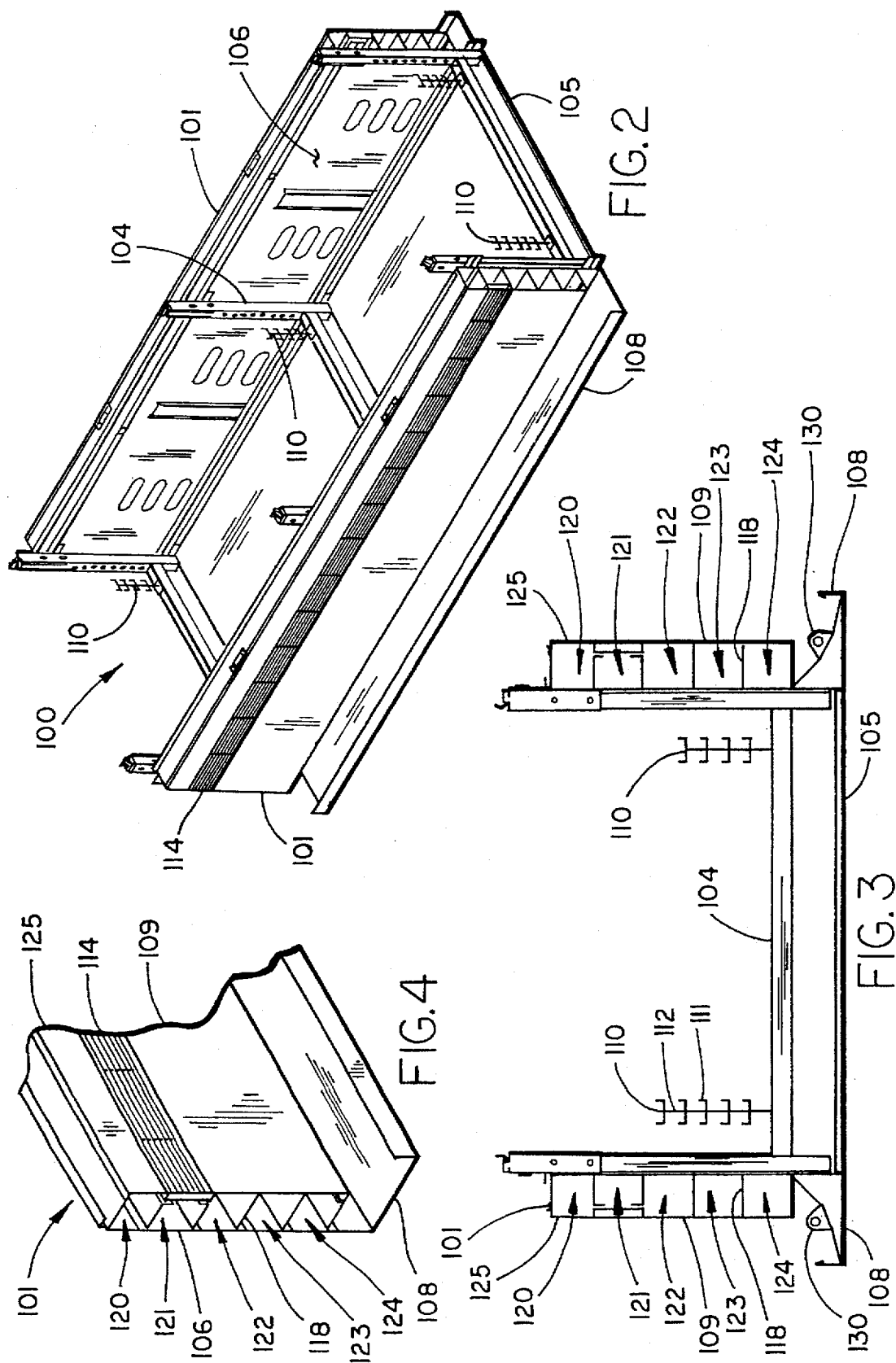

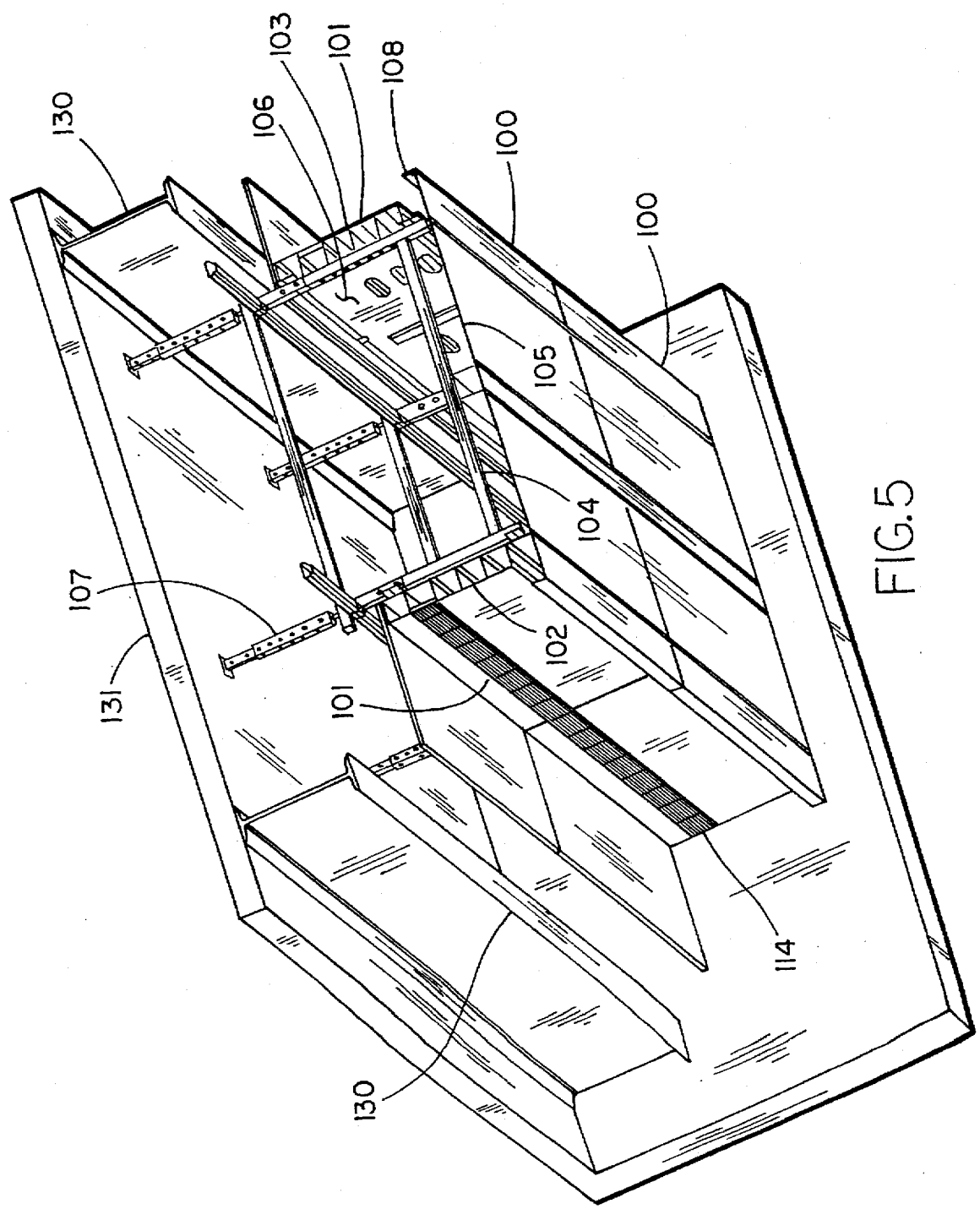

MODULAR UTILITIES COVER

CROSS-REFERENCES TO RELATED APPLICATIONS

This is a continuation-in-part of application Ser. No. 08/367,804, filed Dec. 30, 1994 to Greer et al., entitled "INTEGRATED PREFABRICATED FURNITURE SYSTEM FOR FITTING-OUT OPEN PLAN BUILDING SPACE" which is hereby incorporated by reference. The present application is also related to the following, commonly assigned, co-pending United States patent applications which are hereby incorporated by reference.

| Title | Ser. No. | Filing Date |
|---|---|---|
| Furniture Systems | 07/774,563 | 10-08-91 |
| Utility Floor Construction | 08/063,500 | 05-18-93 |
| Utility Distribution System | 08/063,463 | 05-18-93 |
| Portable Partition System | 08/367,802 | 12-30-94 |
| Furniture System (COMMONS/PATHWAYS) | 08/450,255 | 05-25-95 |
| Integral Prefabricated Finished System for Building Space (PATHWAYS-ZONE WALL AND SPACE FRAME) | 08/450,820 | 05-25-95 |

BACKGROUND OF THE INVENTION

The present invention relates to furnishings, and in particular to a furniture system that is particularly adapted to support group activities in open plans, and the like.

Open office plans are well known in the art, and generally comprise large, open floor spaces in a building that are furnished in a manner that is readily reconfigurable to accommodate the ever changing needs of a specific user, as well as the divergent requirements of different tenants. One arrangement typically used for furnishing open plans includes movable partition panels that are detachably interconnected to partition off the open space into individual workstations and/or offices. Some such partition panels are configured to receive hang-on furniture units, such as worksurfaces, overhead cabinets, shelves, etc., and are generally known in the office furniture industry as "systems furniture." Another arrangement for dividing and/or partitioning open plans includes modular furniture arrangements in which a plurality of differently shaped, freestanding furniture units are interconnected in a side-by-side relationship, with upstanding privacy screens attached to at least some of the furniture units to create individual, distinct workstations and/or offices.

Such prior art partitioning arrangements create relatively permanent, multi-function workstations for the users, which workstations are required to support both individual work activities, as well as some types of group activities, such as inter-office conferences, and the like. However, these types of conventional workstation arrangements are not particularly adapted to support workers engaged in group work, such as self-managing teams, or others involved in team problem solving techniques, wherein a relatively large number of workers from different disciplines, such as engineering, design, manufacturing, sales, marketing, purchasing, finance, etc., meet together as a group to define and review issues, set general policy, and then break out into a number of smaller sub-groups or individuals to resolve those specific problems relating to their particular discipline. Team projects typically have a rather specific objective and are of a limited duration, such that the individual workers are temporarily assigned to the group for the life of the project, and are then reassigned to a new group when the project is completed. Group work is steadily gaining importance as a way of improving productivity and time-to-market, thereby emphasizing the need to support such activities more efficiently and effectively.

Conventional conference rooms, meeting halls, and the like have heretofore been required to handle such group meetings, but are typically expensive to construct and maintain, and are not usually considered an efficient use of space in open plan environments. When such conventional rooms are constructed in rented office space, they become permanent leasehold improvements, which must be depreciated over a lengthy time period, and can not be readily removed upon the expiration of the lease. The reconfiguration of such spaces is quite messy, and very disruptive to conducting day-to-day business. Furthermore, with conventional conference room arrangements, breakout meetings among the various sub-groups of workers often prove inconvenient, since the workstations of the participant workers are seldom located in close proximity to the conference room.

Another objective of furnishings from modern office environments is to promote the establishment of an optimum balance between worker privacy and worker interaction. Throughout a given workday, an office worker normally oscillates between interaction with others and time spent alone. Each such worker actively seeks out or avoids others based upon their ever changing task, objectives, and goals. Furnishings can serve to help these workers better regulate involvement with or isolation from coworkers. For example, full height offices are known for privacy. Their surrounding walls and door provide privacy by consistently controlling unwanted distractions, but often limit opportunities for spontaneous interaction. On the other hand, open offices precipitate an awareness of coworkers. Furniture and partition based workstations encourage participation and convenient access, but often lack sufficient controls for individual quiet work. Both private workspace and convenient access to coworkers for the completion of work involving group or team efforts is quite important to the overall success of such projects.

The use of displays to communicate information to large groups in office environments and the like, is also generally well-known, and includes such devices as marker boards, tackable surfaces, electronic displays, reflective projector screens, etc. Such displays are normally incorporated into conventional style conference rooms, meeting halls, and other similar facilities. However, as previously noted, such conventional meeting spaces are typically expensive, and are not usually considered a cost effective use of floor space in most modern offices. Rather, modern office layouts are typically of the open plan type, and do not include large, conventional types of conference rooms.

Information displays in modern, open plan workstations, such as those created by movable partition panels, modular furniture, or the like, are usually quite limited, and not particularly adapted to support workers engaged in group or team problem solving techniques. Due to the inherent nature of group problem solving techniques, the effective display of information is quite important to the effective management of the team's human resources.

Office space users are experiencing increasing needs for improved utilities support at each workstation or work setting. These "utilities," as the term is used herein, encompass all types of resources that may be used to support or service a worker, such as communications and data used with computers and other types of data processors, telecommunications, electronic displays, electrical power, and physical accommodations, such as lighting, signage, security, sound masking, and the like. For example, modern offices for highly skilled "knowledge workers" such as engineers, accountants, stock brokers, computer programs, etc., are typically provided with multiple pieces of very specialized computer and communications equipment that are capable of processing information from numerous local and remote data sources to assist in solving complex problems. Such equipment has very stringent power and signal requirements, and must quickly and efficiently interface with related equipment at both adjacent and remote locations. Many other types of high technology equipment and facilities are also presently being developed which will need to be accommodated in the workplaces of the future.

In order to gain increased efficiency in the use of expensive office real estate, attempts are now being made to try to support highly paid knowledge workers with modular furniture systems in open office settings, instead of conventional private offices. However, in order to ensure peak efficiency of such knowledge workers, the work settings must be equipped with the various state-of-the-art utilities and facilities. Since such work settings must be readily reconfigurable to effectively meet the ever-changing needs of the user, the distribution and control of utilities throughout a comprehensive open office plan has emerged as a major challenge to the office furniture industry. The inherent nature of modular furniture system, which permits them to be readily reconfigurable into different arrangements, makes it very difficult to achieve adequate utility distribution and control.

Hence, utility distribution and control are fast becoming one of the major issues in office fit-out and furniture. Changing technology is creating greater demands on power and signal distribution networks. Routing power and signal distribution below the floor or in furniture systems often ends up in complex idiosyncratic systems which are difficult to manage or change. There is presently an oversupply of office space and furniture systems which do not properly respond to or support change. Many older buildings do not have adequate utility capabilities and the cost of conventional renovations or improvements often renders the same in practice. Even relatively new buildings can quickly be rendered obsolete by the fast paced changes in modern technology. The refurnishing of existing building space is therefore a concern which must be addressed by furniture systems.

SUMMARY OF THE INVENTION

A plurality of demountable overhead utility cover units are provided for use in a building room of the type having a generally open plan and an associated floor surface. The utility cover unit provides a transition to enclose the space between ceilings of different heights. The modular bulkhead panel includes a vertical support structure extending between the ceilings of different heights, and a plurality of cover panels detachably attached to the structure, each cover panel having a horizontally elongated front elevational shape. The utility cover unit also has at least one horizontally extending utility trough positioned along a lower portion of the utility cover unit for distributing utilities to the building room. Each utility cover unit has a connector at each end adapted to connect horizontally adjacent demountable utility cover units in an end-to-end manner.

Another aspect of the present invention is to provide the demountable overhead utility cover units in a plurality of lengths. The different lengths of the units facilitate custom installations in ceilings of different dimensions. The utility cover units are provided in a multiple range of widths.

A further aspect of the present invention is to interface the ceiling structure with the panels of a demountable movable wall system. The demountable overhead utility cover units have a bottom adapted to abut a top surface of demountable movable wall system wall panels, thus providing the elements necessary to construct an office environment and to transfer utilities through a bulkhead such as heating, ventilation and air condition, water, and the like whereby the generally open plan of the building room can be subdivided into individual privatized offices or into ceilings of desired heights in open areas.

A still further aspect of this invention is to provide for distribution of utilities in the building room. One of the cover panels on the utility cover unit can be formed as an air duct having a rear side adapted to be connected with a building ventilation duct located in the ceiling. The cover panel also has a ventilation grate on a front side to deliver ventilation air to the interior of the building room, or the cover panel front side can be formed as a continuous grille extending the length of the utility cover unit. A bottom portion of the utility cover unit has a trough in which electrical or communication cables can be routed.

Another aspect of the invention is to provide a transition between ceilings of dissimilar heights where a top portion of the bulkhead panel has brackets for suspending the panel at a predetermined height above the room floor. A top portion of the bulkhead interfaces with and provides a ledge for receiving ceiling panels of an upper existing ceiling, and a lower portion of the bulkhead panel has a lip on a rear side for receiving ceiling panels of the second lower ceiling.

These and other features, advantages, and objects of the present invention will be further understood and appreciated by those skilled in the art by references to the following specification, claims, and appended drawings.

BRIEF DESCRIPTION OF THE DRAWINGS

FIG. 2 is a perspective view of a linkhead bulkhead segment.

FIG. 3 is an end view of the linkhead bulkhead segment.

FIG. 4 is a fragmentary perspective view of the end of a linkhead panel.

FIG. 5 is a perspective view of a linkhead bulkhead segment installed in a building room.

DETAILED DESCRIPTION OF THE PREFERRED EMBODIMENTS

Figure 1:
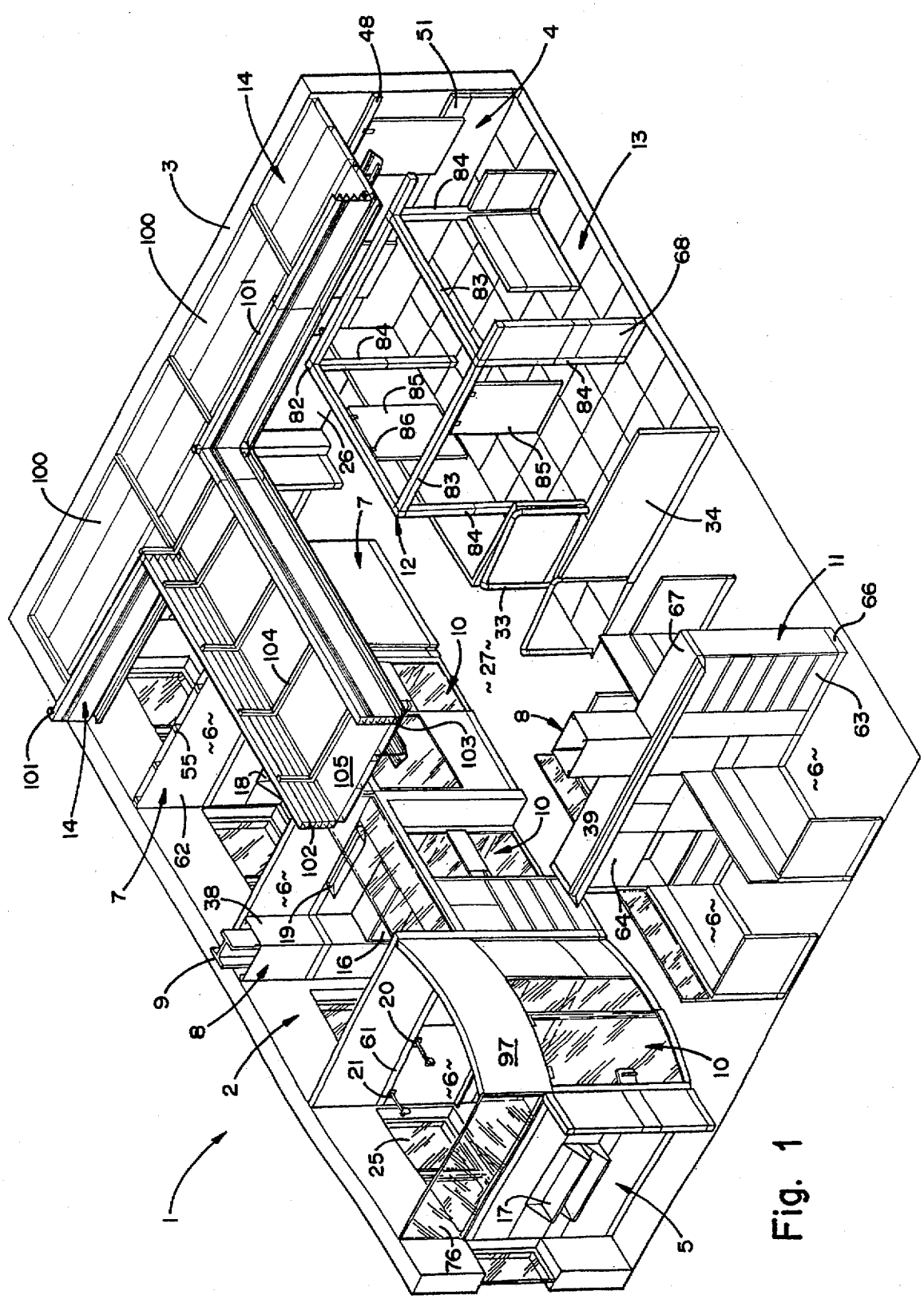
FIG. 1 is a perspective view of a linkhead bulkhead system for use in an integrated prefabricated furniture system embodying the present invention.

For purposes of description herein the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 1 (FIG. 1) generally designates an integrated prefabricated furniture system embodying the present invention. Furniture system 1 is particularly adapted for finishing or fitting-out building space, rooms etc., 2 of the type having a generally open plan interior defined by fixed interior and exterior walls 3. Such building spaces 2 are typically designed for use as offices, facilities for education/training, hotels/motels, conference centers, medical treatment, and other similar purposes. A demountable architectural wall system 4 (Plus wall) covers the fixed walls 3 of building room 2, a portable partition wall system 5 (Zone Wall) divides the interior space of the building room into individual workstations or work settings 6, and a demountable movable wall system 7 (Link wall) forms custom width partitions. The three wall systems 4, 5, and 7, are completely compatible and fully integrated in both function and appearance. A modular column cover system 8 selectively covers support columns 9 in building room 2, and provides vertical utility routing and storage that integrates with wall systems 4, 5, and 7. A space frame system 12 is particularly beneficial in supporting group activities, and the like, and includes utility passageways which communicate with wall systems 4, 5, and 7 to effectively and efficiently distribute utilities throughout building room 2. A prefabricated low raised floor system 13 is supported directly on the floor of building room 2, and conforms with the various furniture elements to provide support for those work settings 6 requiring maximum utility capabilities. Furniture accessories, such as hang-on binder bins 16, shelves 17, paper managers 18, task lighting 19, displays 20, etc. are designed to be used anywhere throughout furniture system 1. Furniture system 1 is readily reconfigurable to meet the ever-changing needs of the user, and minimize permanent leasehold improvements.

The illustrated raised floor system 13 has a prefabricated construction, and is abuttingly supported directly on the floor surface 7 of building room 2. Although floor system 13 contemplates a wide variety of different constructions, preferably it has a thin-raised construction with a relatively low profile to facilitate easy ingress and egress from floor surface 27 of building room 2. Examples of suitable floor systems 13 are provided in commonly assigned, co-pending U.S. patent application Ser. No. 08/063,500, filed May 18, 1993, entitled UTILITY FLOOR CONSTRUCTION, as well as Ser. No. 08/063,463, filed May 18, 1993, entitled UTILITY DISTRIBUTION SYSTEM, which have been incorporated herein by reference. Regardless of the specific construction of low raised floor system 13, it has a hollow interior with optional passageways (not shown) therethrough in which utilities are routed to their desired locations. A ramp area 32 of floor system 13 facilitates ingress and egress between floor system 13 and the floor surface 27 of building room 2, while rails 33 and partitions 34 are provided about the open peripheral edges of floor system 12.

The illustrated prefabricated wall system 4, which is also referred to herein as the Plus wall system, is a demountable architectural wall system that is particularly designed for covering the fixed walls 3 of building room 2. Plus wall system 4 includes a plurality of horizontally extending mounting channels 48 which are attached to the fixed walls 3 of building room 2 along upper and lower portions thereof. A plurality of horizontally extending belt zone utility troughs 49 are also provided for attachment to the building room fixed walls 3 at a position vertically between the upper and lower portions thereof, adjacent to standard worksurface height. A plurality of cover panels 50–51 are provided, at least some of which are full width, and have a horizontally elongated from elevational shape. Cover panels 50–51 are detachably mounted on the mounting channels 48 and utility troughs 49 to thereby cover the fixed walls 3. Preferably, mounting channels 48 include a hanger channel on which at least some of the furniture accessories may be supported, including hanging panels, ambient and task lighting, as well as hang-on storage with the use of additive support rails (not shown). The illustrated Plus wall system has both full and partial height segments. In general, Plus wall system 4 is a system of additive architectural wall elements for adding utility and upgrading finish to existing walls.

The illustrated prefabricated wall system 7 which is also referred to herein as the Link wall system, is a demountable movable wall system for forming custom width partitions that are compatible with the Plus wall system 4 and the Zone wall system 5. Link wall system 7 includes a plurality of vertical studs 55, adapted to be positioned in a side-by-side relationship. A plurality of horizontal channels 56 are provided in different lengths and are shaped to be attached to the studs 55 adjacent standard worksurface height to rigidly interconnect the same in a mutually parallel relationship, and forming a belt zone utility trough 49 to permit the continuous routing of utilities therethrough, along with the belt zone utility troughs 49 on Plus wall system 4, as well as Zone wall system 5. A plurality of cover panels 57 and 58 are detachably mounted on the opposite sides of studs 55 to enclose the same. In the example shown the Link wall system 7 has base passageways 60 along the bottom edges of partitions 54, expressway passageways 61 along the top edges of partitions 54, and transoms 62 mounted on top of expressway passageways 61, which extend to the ceiling.

The illustrated prefabricated wall system 5 which is also referred to herein as the Zone wall system, is a portable partition system that spatially defines the open plan interior of the building room 2 into individual and group work settings 6. Zone wall system 5, which is disclosed in greater detail in commonly assigned, co-pending U.S. patent application Ser. No. 08/367,802, filed Dec. 30, 1994, entitled PORTABLE PARTITION SYSTEM (PATHWAYS-ZONE WALL), which has been incorporated herein, generally includes a plurality of freestanding panels 68 interconnected side-by-side in a predetermined plan configuration. Each Zone wall panel 68 has an internal frame, at least some of which includes a horizontally extending utility passageway 70 positioned adjacent worksurface height. A plurality of cover panels 71–72 are provided, each having a horizontally elongated front elevational shape, and being detachably mounted on opposite sides of the frame to enclose the same. In the illustrated examples, Zone wall panels 68 also include base passageways 74 extending along the bottom edges of the panels, and expressway passageways 61 extending along the top edges of the panels, as well as glass transoms 76 and full transoms 62. The full transoms 62 may have hollow interiors through which wires, cables and other utilities can be routed.

The illustrated space frame system 12 is particularly designed to support group work activities in an open portion of the open plan interior of associated building room 2. Space frame system 12 is disclosed in greater detail in commonly assigned, co-pending U.S. patent application Ser. No. 774,563, filed Oct. 8, 1991, entitled FURNITURE SYSTEM ("COMMONS"), and in the illustrated example includes an overhead framework 82, comprising a plurality of beam segments 83 interconnected in an end-to-end fashion to form a rigid structure configured to be positioned above the floor surface 27. Space frame system 12 also includes a plurality of overhead support columns 84, each having an upper portion thereof connected with overhead framework 82, and a lower portion thereof shaped to abut the prefabricated floor system 13. It is to be understood that space frame system 12 can also be supported directly on the floor surface 27 of building room 2. In any event, columns 84 support framework 82 in a freestanding fashion within building room 2 at a predetermined elevation above average user height. Space frame system 12 also includes a plurality of individual panels 85 which have a lightweight construction to permit easy, manual, bodily translation of the same by an adult user. The panels 85 include connectors 86 that detachably mount the same on overhead framework 82 at various locations therealong in a manner in which panels 85 hang downwardly from overhead support 82 in a generally vertical orientation, and are readily and easily manually removable therefrom and reconfigurable thereon by the user. Panels 85 may include sound attenuation to facilitate partitioning, as well as special exterior surfaces for displays. The horizontal beam segments 83 of framework 82, as well as support columns 84 include utility passageways 87 and 88 associated therewith to facilitate providing utilities to the associated work area. In one example of the present invention, beam segments 83 and support columns 84 have substantially hollow constructions, forming passageways 87 and 88 therein, which are divided to physically separate power and cable wires. In the example illustrated in FIG. 1, space frame system 12 is positioned directly on top of prefabricated floor system 13, and a Zone wall panel 68 extends from the outside pair of support columns 84.

The illustrated linkhead system 14 (FIGS. 1, 2, and 5) is designed for overhead routing of utilities throughout building room 2, and comprises a plurality of like bulkhead segments 100, each of which is supported from the structure or ceiling of building room 2, and is mutually interconnected end-to-end to define a continuous housing in which utilities are carried. In the examples illustrated in FIGS. 2 and 5, two pairs of linkhead units 101 are arranged on opposite sides of each bulkhead segment 100 to form two sets of vertically stacked passageways 102 and 103. Each of the bulkhead segments 100 is mounted on an open framework 104, which is in turn suspended from the building structure by adjustable straps or struts 107. Modular cover panels 105 are mounted on the lower side of framework 104, and extend continuously between the opposite linkhead units 101, so as to form a U-shaped enclosure through which utility conduits such as HVAC ducts, sprinkler pipes, power lines, in conduit communication lines, signage, etc. can be routed through building room 2. The linkhead units 101 may include a flat vertically extending common rear wall 106 with a plurality of horizontal flanges extending outwardly therefrom to form the vertically stacked columns of mutually isolated series of passageways 102 and 103. An accessory hanger channel 108 preferably extends along the lower edge of each linkhead unit 101, and is adapted to support a plurality of office accessories thereon, such as lights, motion sensors, etc. Preferably, each of the passageways in series of passageways 102 and 103 is dedicated to a specific type of utility, so that they can be physically separated from one another, and thereby alleviate interference.

With reference to FIG. 5, a modular bulkhead construction 100 embodying the present invention is illustrated, and comprises two pairs of linkheads 101 arranged end-to-end on opposite sides of bulkhead 1 to form two sets of vertically stacked passageways 102 and 103. Each of the linkheads 101 is mounted on an open framework 104, which is in turn suspended from a building ceiling by adjustable straps or struts 107. Modular cover panels 105 are mounted on the lower side of framework 104, and extend continuously between the opposite linkheads 101, so as to form a U-shaped enclosure through which utility conduits, such as HVAC duct, sprinkler pipes, power lines, communication lines, etc. can be routed through a building. Modular cover panels 105 can be hinged along one edge and latchable along an opposite edge for easy opening and closing of panels 105 to gain access to utilities within bulkhead 100.

A typical linkhead unit 101 is illustrated in FIGS. 2 and 3, and comprises a flat, vertically extending common rear wall 106, with a plurality of horizontal flanges 118 extending outwardly therefrom to form two to six vertically stacked, mutually isolated passageways and are illustrated in an embodiment of five passageways 120–124, respectively. An accessory hanger channel 108 extends along the lower edge of linkhead 101, and is adapted to support thereon a plurality of office accessories, such as lights, motion sensors, etc. Light fixture 130 is illustrated in an installed position in hanger channel 108 to provide indirect lighting to the work areas proximate to bulkhead 100. Preferably, the utility passageways 120–124 are each dedicated to a specific type of utility, so that they can be physically separated from one another, and thereby avoid interference. For example, in the illustrated structure, passageway 121 is dedicated to conditioned air, and includes a grill-like cover 114 over the outer face thereof. Utility passageway 120 is designed to house smoke detection equipment, may include the mounting of sprinkler heads (not shown) thereon, and has a closed exterior cover 125 along the exterior side thereof. Utility passageways 122, 123, and 124 are each fully enclosed by a single, detachable exterior cover panel 109 extending along the outer faces thereof. These utility passageways 122–124 may be dedicated to power, communication, and plumbing, respectively. Linkhead unit 101 may assume a variety of different heights and passageway configurations depending upon the requirements of the specific installation. Each of the differently configured linkhead units 101 has at least two horizontally extending utility passageways.

FIGS. 2 and 3 also illustrate the incorporation of cable trees 110 mounted to frame 104 within the U-shape of bulkhead 100. Trees 110 are comprised of central stem 112 with a plurality of branches 111 extending laterally from stem 112. Individual cables such as electrical or communication cables can be routed between trees 110 and individually secured to branches 111 with plastic ties as a means for cable management in bulkhead 100.

In operation, bulkhead 100 is provided in individual modules or segments. Each segment of modular bulkhead 100 is suspended from the building ceiling 131 and interconnected in an end-to-end relationship so as to form a continuous duct through the building. In the example illustrated in FIG. 5, bulkhead 100 is positioned between a pair of building beams 130, so as to use the space formed therebetween, although other configurations are also contemplated. When the user desires to reconfigure building room 2 or in the event of user relocation, bulkhead units 100 can be demounted from ceiling 131 and transported to a new area of building room 2 or relocated to another building for reuse by the user thereby conserving resources.

Figure 6:
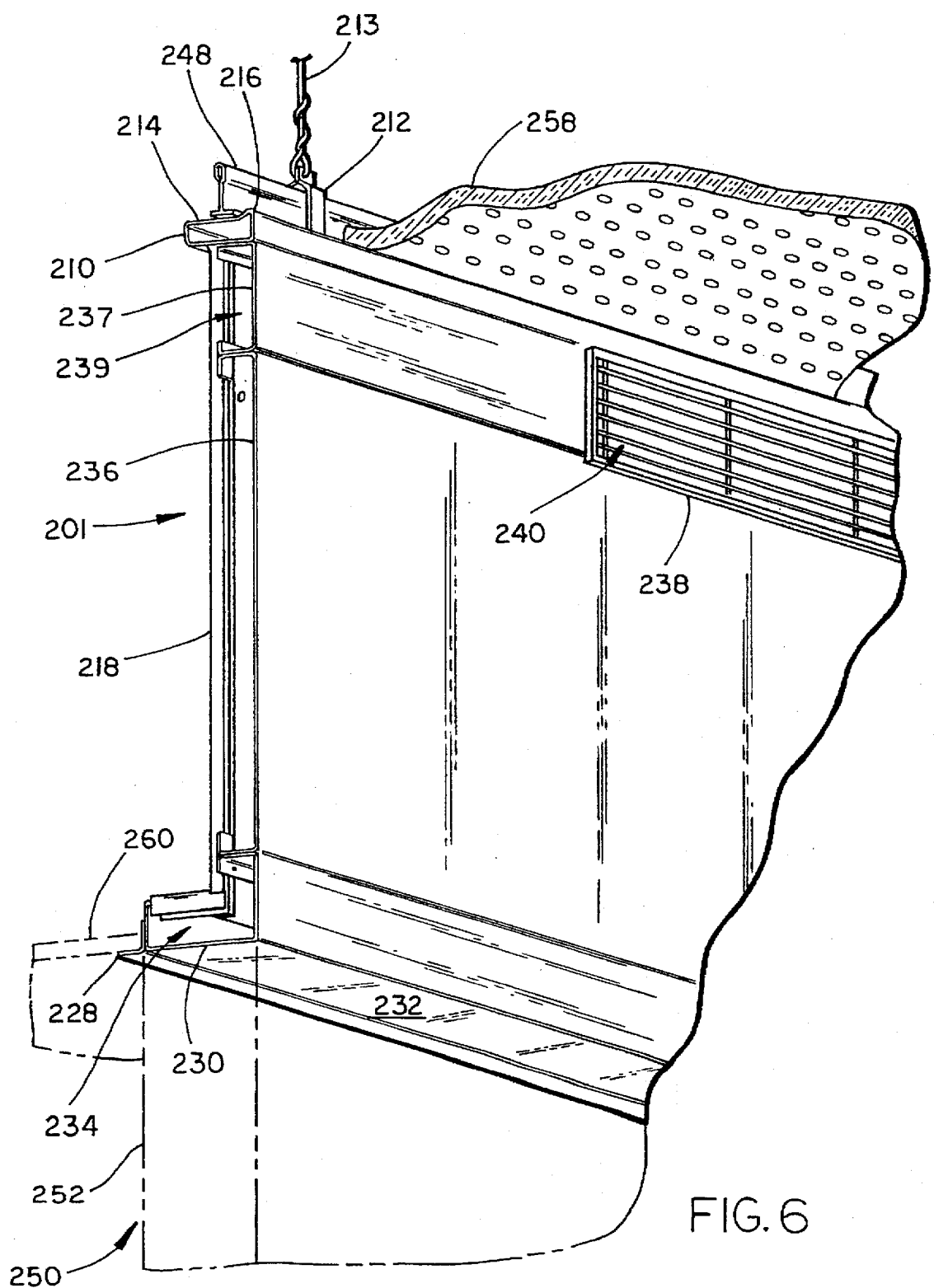
FIG. 6 is a fragmentary perspective view of the alternate embodiment demountable overhead utility cover unit showing the panel suspended from a ceiling and interfacing with ceilings of differing heights.
Figure 7:
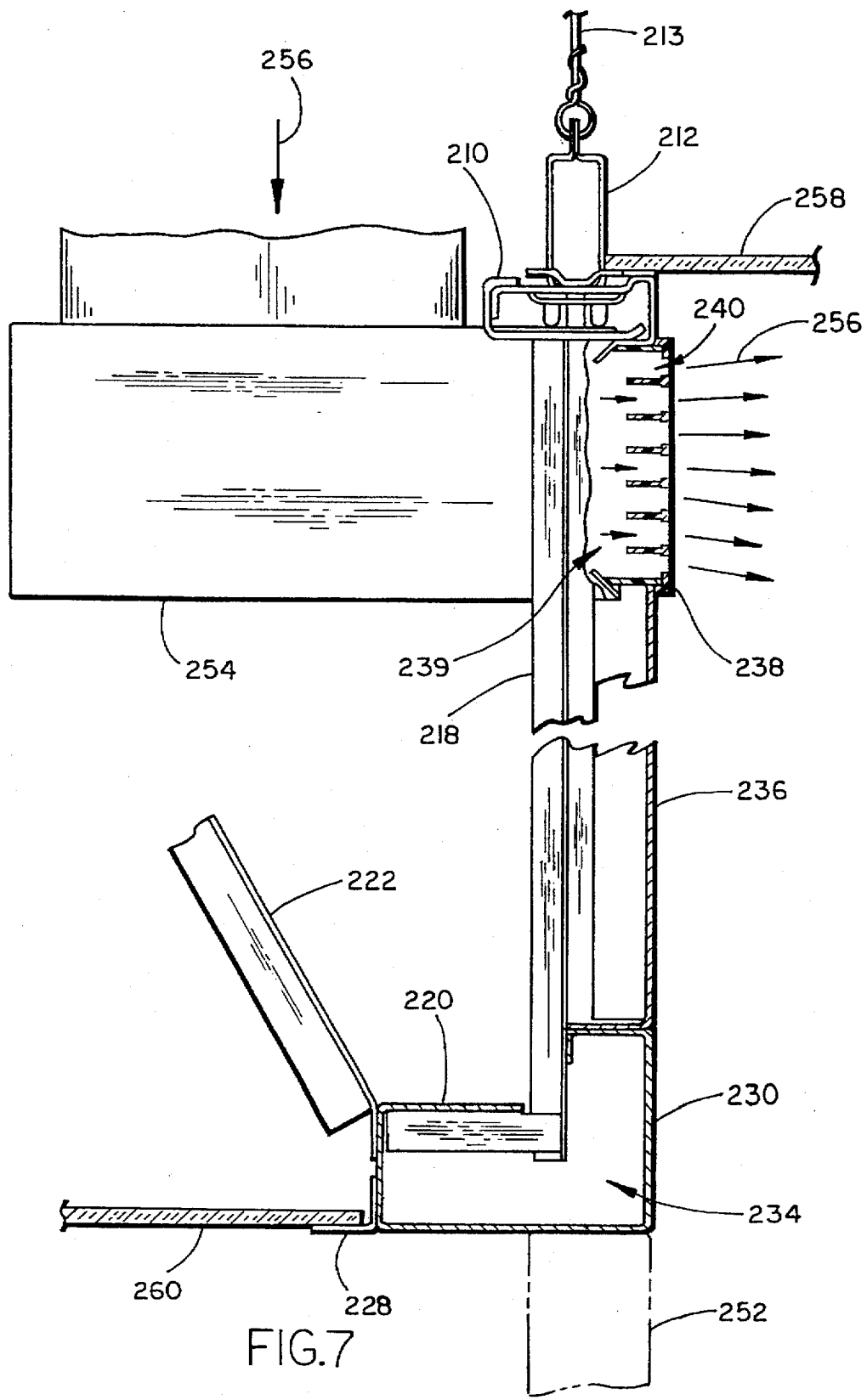
FIG. 7 is a side elevational view of the demountable overhead utility cover unit showing the unit interfaced with a ventilation air duct and the distribution of ventilation air therethrough.
Figure 8:
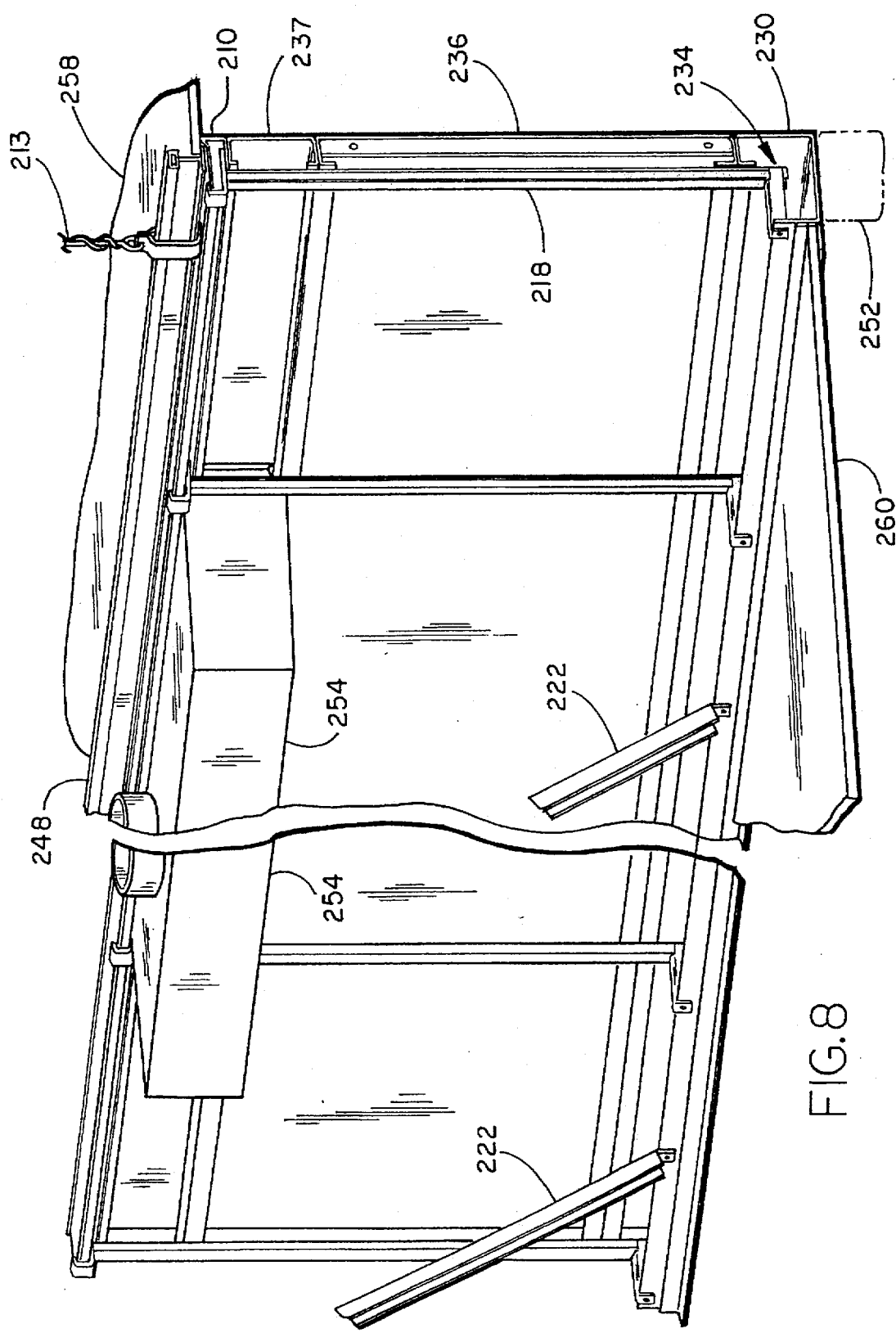
FIG. 8 is a fragmentary, perspective view of a rear portion of the demountable overhead utility cover unit.

An alternate embodiment of linkhead unit 101 is a demountable overhead utility cover unit 201 illustrated in FIGS. 6–8. Demountable overhead utility cover unit 201 is designed for transitioning between two ceilings of unequal height above floor surface 27 (FIG. 1) and for overhead routing of utilities throughout building room 2 (FIG. 1). In the alternate embodiment, linkhead system 14 comprises a plurality of like demountable overhead utility cover units 201, each of which is supported from the structure or ceiling of building room 2, and is mutually interconnected end-to-end with an adjacent utility cover unit 201 to enclose the space between the ceilings of different height. In the example illustrated in FIG. 6, each of the demountable overhead utility cover units 201 is integrated with the associated ceilings and is suspended from the building structure by adjustable straps or wires 213. Utility cover units 201 can be arranged on opposite sides of ceiling segments 262 similar to linkhead panels 101 in FIG. 1 to form two opposing vertical transitions from upper ceiling 258 to lower ceiling 260. Ceiling panels 260 are mounted on framework 248 which extends continuously between the opposite utility cover units 201, so as to form a U-shaped enclosure through which utility conduits such as HVAC ducts, sprinkler pipes, power lines, communication lines, etc. can be routed throughout building room 2.

Referring now to FIGS. 6 and 7, a demountable overhead utility cover unit is shown mounted in a typical modular office system setting. Utility cover unit 201 is comprised of a top horizontal header 210 extending the length of utility cover unit 201. Header 210 has an upper surface 214 to which hanging brackets 212 are attached. Hanger brackets 112 interface with ceiling framework 248 and are suspended at a predetermined height with hanger wire 213 having one end affixed to bracket 212 and a second end (not shown) affixed to a portion of the building structure above ceiling height (also not shown). A front side of header 210 has a ledge 216 extending the length. Ceiling panels 258 of an upper ceiling are received on ledge 216 for support thereof. A vertical support structure 218 depends from header 210. In this embodiment, vertical support structure 218 is fabricated from square tubular stock, and extends to a lower portion of utility cover unit 201. A horizontal leg 220 extends rearward from the bottom of vertical support structure 218. Horizontal trough 230 is affixed to the bottom of vertical support structure 218 and horizontal leg 220 thereby forming trough cavity 234 wherein utilities such as electrical wiring, communication/data lines, or water lines and the like may be routed throughout the ceiling system.

Figure 9:
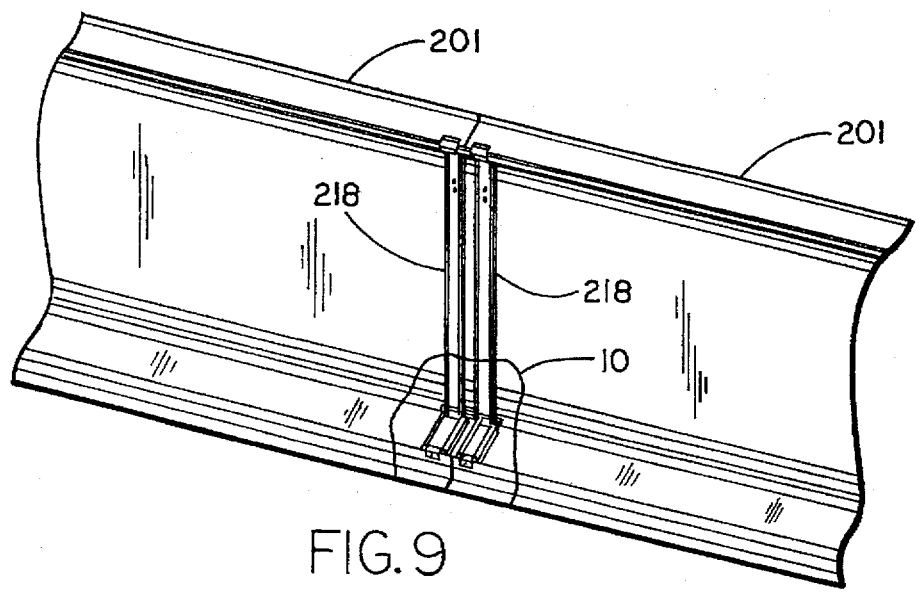
FIG. 9 is a fragmentary perspective view of two demountable overhead utility cover units in a joined end-to-end relationship.
Figure 10:
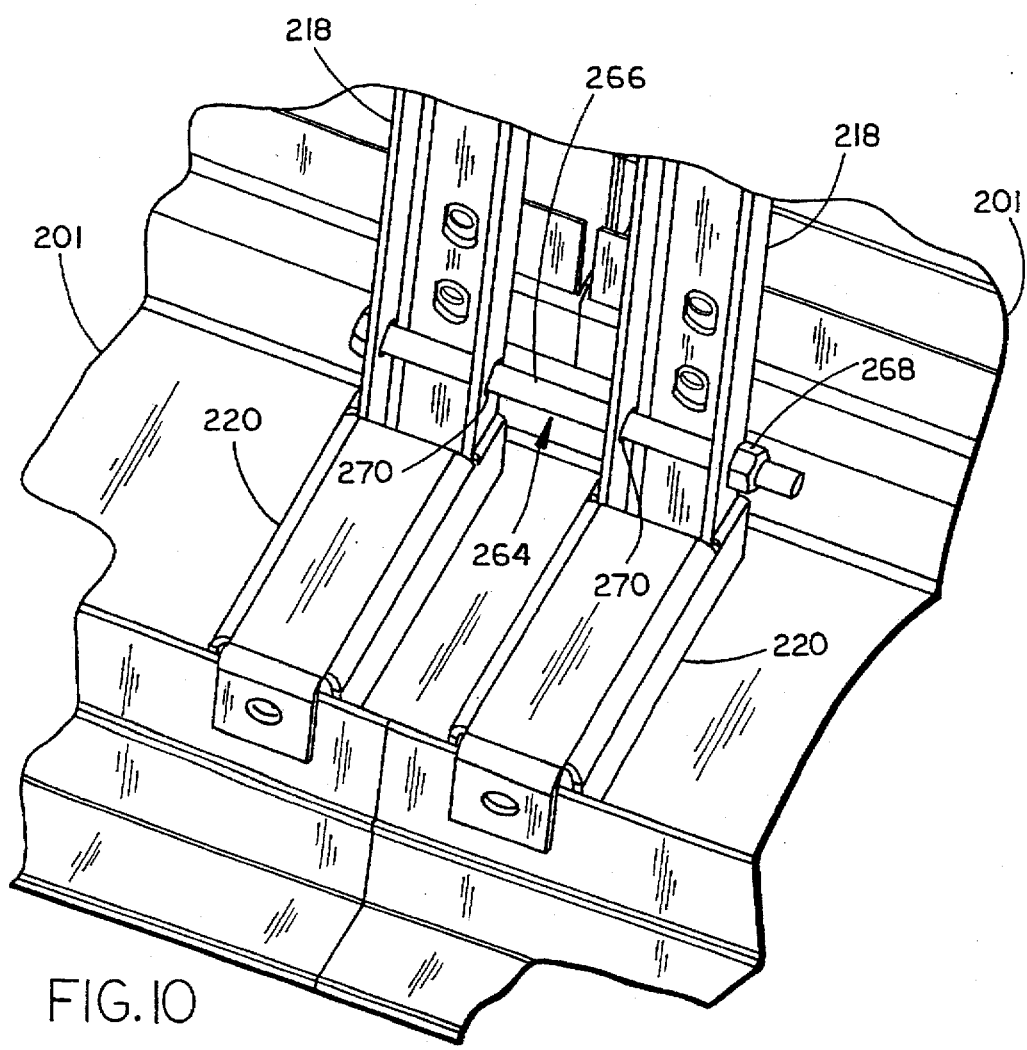
FIG. 10 is a fragmentary perspective enlarged view of the end-to-end joint.

Referring to FIGS. 9 and 10, a vertical support structure 218 and horizontal leg 220 are positioned proximate each end of a utility cover unit 201. When utility cover units 201 are joined in an end-to-end relationship, the cover units 201 are connected by a connector 264 to maintain a fixed relationship. In the preferred embodiment, connector 264 comprises bolt 266 engaging holes 270 in adjacent vertical supports 218 of adjacent cover units 201. Holes 270 are like positioned in each of cover units 201 such that insertion of bolt 266 therethrough insures that adjacent cover units 201 are in substantial alignment. Bolt 266 is retained in holes 270 by threading nut 268 on the end of bolt 266.

Cover panels 236 are detachably attached to vertical support structure 218 for enclosing the open space between lower ceiling panels 260 and upper ceiling panels 258. Cover panels 236 each have a horizontally elongated front elevational shape and are detachably attached to vertical support structure 218. Cover panels 236 can be finished in a variety of manners to conform with the decor and aesthetics of the office system constructed within building room 2.

Referring to FIGS. 6–8, a cover panel 237 can be adapted to provide air flow 256 from ventilating duct 254 into an office or into building room 2. To facilitate air flow 256, cover panel 237 can have an air duct aperture 240 formed therein and a grate 238 detachably attached to cover panel 237 for the delivery of ventilation air 256. Cover panel 237 can be formed in a manner such that panel 237 forms enclosed duct 239 extending the length of utility cover unit 201. The end-to-end connectivity of utility cover units 201 then forms a continuous air duct extending the length of connected utility cover units 201. Another embodiment of air duct grate 138 comprises a grille such as grille 114 in FIG. 2 extending the length of utility cover unit 201 thereby providing a continuous visual line and a uniform presentation of the panel aesthetics as opposed to the inclusion of a smaller grate 238 at periodic intervals along the installation of utility cover units 201.

Demountable overhead utility cover units 201 are also adapted on a bottom surface 232 of trough 230 to abut the top surface of wall panel 252 of demountable movable wall system 250. The 'stacking' of utility cover units 201 on wall panels 252 provide a system that is readily integrated with demountable moveable wall system 250 to provide a completed office interior in building room 2.

Each of the demountable overhead utility cover units 201 can be fabricated in a variety of lengths. Panels of different lengths are convenient for the fitting out of different building rooms of different dimensions. However, to facilitate uniformity and productability, each of the utility cover units 201 are manufactured in lengths which are multiples of the shortest available utility cover unit 201. For example, the utility cover units 201 can be manufactured in a two foot length with additional utility cover units available in 4, 8, and 16 foot lengths. Thus, a building room of any standard size can be readily outfitted with a combination of utility cover units 201 to readily meet size requirements of the room. When a user desires to reconfigure building room 2 or in the event of user relocation, utility cover units 201 can be demounted and transported to a new location for reuse.

In operation, demountable overhead utility cover units 201 are provided in segments. Each segment of utility cover units 201 is suspended from the building structure within building room 2 and interconnected with the ceilings to be transitioned. The individual segments are interconnected in an end-to-end relationship so as to form a continuous vertical cover unit.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A plurality of demountable overhead utility cover units in combination with at least one panel of a demountable moveable wall system having a utility passageway extending therethrough for use in a building room of the type having a generally open plan, an associated floor surface and ceilings of different heights, each of said demountable overhead utility cover units comprising:

a vertical open framework comprising a header and a lower member vertically separated by at least one vertical support, said framework adapted to extend between the ceilings of different heights;

at least one horizontally extending utility trough positioned along a lower portion of said units for distributing utilities through an upper edge of said at least one panel of said moveable wall system to said utility passageway;

at least one cover panel, said cover panel having a horizontally elongated front elevational shape, detachably attached to said vertical open framework to access said trough and further adapted to access a space defined by the ceilings of different heights; and a connector at an end of each of said demountable units, said connector adapted to interconnect horizontally adjacent demountable overhead utility cover units in an end-to-end manner.

2. A plurality of demountable overhead utility cover units according to claim 1, wherein:

said demountable overhead utility cover units are provided in a plurality of different lengths to facilitate custom installations in ceilings of different dimensions such that the length of each of said different length demountable overhead utility cover units is a multiple of a smallest length demountable overhead utility cover unit.

3. A plurality of demountable overhead utility cover units according to claim 2, wherein:

at least one cover panel has at least one aperture, said cover panel aperture in communication with a ventilation duct above the ceiling of different heights for distributing ventilation air to the building room through said at least one aperture in said at least one cover panel and a ventilation grate is detachably attached to said at least one aperture for directing the flow of the ventilation air so distributed to the building room.

4. A plurality of demountable overhead utility cover units according to claim 3, wherein:

said at least one cover panel having at least one aperture comprises a grille extending the length of said demountable overhead utility cover unit.

5. A demountable overhead utility cover unit in combination with at least one panel of a demountable moveable wall system having a utility passageway extending therethrough for use in a building room of the type having a generally open plan, an associated floor surface and ceilings of different heights, said demountable overhead utility cover unit comprising:

a vertical open framework comprising a header and a lower member vertically separated by at least one vertical support, said framework adapted to extend between the ceilings of different heights;

at least one cover panel, said cover panel having a horizontally elongated front elevational shape, and being detachably attached to said vertical open framework to enclose the space between the ceilings of different heights; and at least one horizontally extending utility trough positioned along a lower portion of said framework for distributing utilities through an upper edge of said at least one panel of said moveable wall system to said utility passageway.

6. A demountable overhead utility cover unit according to claim 5, wherein:

said demountable overhead utility cover unit is provided in different lengths to facilitate custom installations in ceilings of different dimensions such that the length of each of said different length demountable overhead utility cover units is a multiple of the smallest length demountable overhead utility cover unit.

7. A demountable overhead utility cover unit according to claim 6, said demountable overhead utility cover unit further comprising:

a bottom adapted to abut a top surface of said at least one panel of said demountable moveable wall system.

8. A demountable overhead utility cover unit according to claim 7, wherein:

at least one cover panel has at least one aperture, said cover panel aperture in communication with a ventilation duct above one of the ceilings of different heights for distributing ventilation air to the building room through said at least one aperture in said at least one cover panel and a ventilation grate is detachably attached to said at least one aperture for directing the flow of the ventilation air so distributed to the building room.

9. A demountable overhead utility cover unit according to claim 8, wherein:

said at least one cover panel having at least one aperture and said ventilation grate comprises a grille extending the length of said demountable overhead utility cover unit.

10. A demountable overhead utility cover unit according to claim 9, wherein:

said header at a top portion of said utility cover unit interfaces with the first existing ceiling.

11. A demountable overhead utility cover unit according to claim 10, wherein:

said header further comprises brackets attached to an upper surface of said header for suspending said demountable overhead utility cover unit at a predetermined height above the room floor.

12. A demountable overhead utility cover unit according to claim 11, wherein:

said header further comprises a ledge for receiving ceiling panels of the first existing ceiling.

13. A demountable overhead utility cover unit according to claim 12, wherein:

said utility trough is positioned at said bottom of said demountable overhead utility cover unit.

14. A demountable overhead utility cover unit according to claim 13, wherein:

said utility trough further comprises a lip on a rear side thereof for receiving ceiling panels of the second ceiling.

15. A demountable overhead utility cover unit according to claim 14, wherein:

said horizontally elongated front elevations of said cover panels are essentially coplanar.

16. A demountable overhead utility cover unit according to claim 6, wherein:

at least one cover panel has at least one aperture, said cover panel aperture in communication with a ventilation duct above one of the ceilings of different heights for distributing ventilation air to the building room through said at least one aperture in said at least one cover panel and a ventilation grate is detachably attached to said at least one aperture for directing the flow of the ventilation air so distributed to the building room.

17. A demountable overhead utility cover unit according to claim 16, wherein:
said at least one cover panel having at least one aperture and said ventilation grate comprises a grille extending the length of said demountable overhead utility cover unit.

18. A demountable overhead utility cover unit according to claim 17, wherein:
said header at a top portion of said utility cover unit interfaces with the first existing ceiling.

19. A demountable overhead utility cover unit according to claim 18, wherein:
said header further comprises brackets attached to an upper surface of said header for suspending said demountable overhead utility cover unit at a predetermined height above the room floor.

20. A demountable overhead utility cover unit according to claim 19, wherein:
said header further comprises a ledge for receiving ceiling panels of the first existing ceiling.

21. A demountable overhead utility cover unit according to claim 20, wherein:
said utility trough is positioned at a bottom of said demountable overhead utility cover unit.

22. A demountable overhead utility cover unit according to claim 21, wherein:
said utility trough further comprises a lip on a rear side thereof for receiving ceiling panels of the second ceiling.

23. A demountable overhead utility cover unit according to claim 6, wherein:
said header at a top portion of said utility cover unit interfaces with the first existing ceiling.

24. A demountable overhead utility cover unit according to claim 23, wherein:
said header further comprises brackets attached to an upper surface of said header for suspending said demountable overhead utility cover unit at a predetermined height above the room floor.

25. A demountable overhead utility cover unit according to claim 24, wherein:
said header further comprises a ledge for receiving ceiling panels of the first existing ceiling.

26. A demountable overhead utility cover unit according to claim 25, wherein:
said utility trough is positioned at a bottom of said demountable overhead utility cover unit.

27. A demountable overhead utility cover unit according to claim 26, wherein:
said utility trough further comprises a lip on a rear side thereof for receiving ceiling panels of the second ceiling.

28. A demountable overhead utility cover unit having two ends in combination with at least one panel of a demountable moveable wall system having a utility passageway extending therethrough for use in a building room of the type having a generally open plan, an associated floor surface and ceilings of different heights, said demountable overhead utility cover unit comprising:

a vertical open framework comprising a header and a lower member vertically separated by at least two vertical supports, said framework of a predetermined height adapted to extend between the ceilings of different heights, one of said vertical supports positioned at each of said ends of said demountable unit;

a connector at one of said ends of said demountable unit, said connector and said vertical support at said end adapted to interconnect an adjacent demountable unit in an end-to-end relationship;

a plurality of cover panels, each having a horizontally elongated front elevational shape, said cover panels detachably attached to said vertical open framework; and at least one horizontally extending trough positioned along a lower portion of said demountable overhead utility cover unit for distributing utilities through an upper edge of said at least one panel of said moveable wall system to said utility passageway.

29. A demountable overhead utility cover unit according to claim 28, wherein:
said demountable overhead utility cover unit is provided in different lengths such that each of said different length demountable overhead utility cover units is a multiple of the smallest length demountable overhead utility cover unit.

30. A demountable overhead utility cover unit according to claim 29, said demountable overhead utility cover unit further comprising:
a bottom adapted to abut a top surface of said at least one panel of said demountable moveable wall system.

31. A demountable overhead utility cover unit according to claim 30, wherein:
at least one cover panel has at least one aperture, said cover panel aperture in communication with a ventilation duct in the ceiling for distributing ventilation air to the building room through said at least one aperture in said at least one cover panel and a ventilation grate is detachably attached to said at least one aperture for directing the flow of the ventilation air so distributed to the building room.

32. A demountable overhead utility cover unit according to claim 31, wherein:
said at least one cover panel having at least one aperture and said ventilation grate comprises a grille extending the length of said demountable overhead utility cover unit.

33. A demountable overhead utility cover unit according to claim 32, wherein:
said header further comprises at least two suspension brackets attached to an upper surface of said header.

34. A demountable overhead utility cover unit according to claim 33, wherein:
said header further comprises a ledge on an upper surface thereof.

35. A demountable overhead utility cover unit according to claim 34, wherein:
said utility trough is positioned at said bottom of said demountable overhead utility cover unit.

36. A demountable overhead utility cover unit according to claim 35, wherein:
said utility trough further comprises a horizontal rearwardly extending lip on a rear side thereof.

37. A demountable overhead utility cover unit according to claim 36, wherein:
said horizontally elongated front elevations of said cover panels are essentially coplanar.

38. A demountable overhead utility cover unit in combination with at least one panel of a demountable moveable wall system having a utility passageway extending therethrough for use in a building room of the type having a generally open plan, an associated floor surface and ceilings of different heights, said demountable overhead utility cover unit comprising:
- a horizontal header further comprising hanging brackets on a top surface thereof, said top surface further comprising a horizontal ledge;
- at least one vertical support attached to said horizontal header and vertically depending therefrom;
- a horizontal trough attached to a bottom of said at least one vertical support, said horizontal trough further comprising a bottom surface abutting a top surface of said at least one panel of said demountable moveable wall system; and
- at least one cover panel positioned between said header and said utility trough, said panel having a horizontally elongated front elevational shape, and detachably attached to said at least one vertical support wherein said cover panel further comprises an air duct adapted on a rear side thereof to communicate with a ventilation duct above one of the ceilings of different heights and having an aperture on a front side thereof to communicate with an interior of the building room and a ventilation grate detachably attached to said at least one aperture for directing the flow of the ventilation air so distributed to the building room.

39. A demountable overhead utility cover unit according to claim 38, wherein:
said demountable overhead utility cover unit is provided in different lengths such that each of said different length demountable overhead utility cover units is a multiple of the smallest length demountable overhead utility cover unit.

40. A plurality of demountable bulkhead segments in combination with at least one panel of a demountable moveable wall system having a utility passageway extending therethrough for dividing a building room of the type having a generally open plan interior defined by fixed walls and an overhead fixed structure for routing utilities to said at least one panel of said demountable wall system, each of said demountable bulkhead segments being supported from the overhead fixed structure of the building room, and mutually interconnected end-to-end to define a continuous housing through which utilities are routed and distributed, said demountable bulkhead segments comprising:
- an open framework suspended from the overhead fixed structure, said framework further comprising a header and a lower member vertically separated by at least one vertical support;
- at least one linkhead unit vertically mounted to said open framework; and
- at least one modular cover panel mounted to a lower side of said open framework and horizontally extending from said at least one linkhead unit.

41. A plurality of demountable bulkhead segments according to claim 40, wherein:
said suspended open framework defines a cavity for the routing of building utilities therethrough.

42. A plurality of demountable bulkhead segments according to claim 41, wherein:
said at least one linkhead unit further comprises a flat vertically extending rear wall, a plurality of horizontal flanges extending outwardly therefrom, and a removable cover on a front face of said linkhead unit, said rear wall, plurality of horizontal flanges and said removable cover defining at least two horizontally extending passageways.

43. A plurality of demountable bulkhead segments according to claim 42, wherein:
said rear wall of at least one of said at least two horizontal passageways communicates with a ventilation duct within said cavity defined by said open suspended framework and said removable front cover for said at least one of said at least two horizontal passageways comprises a grille having a plurality of apertures therein, said at least one of said at least two horizontal passageways dedicated to transferring conditioned air from the ventilation duct to the interior of the building room.

44. A plurality of demountable bulkhead segments according to claim 43, wherein:
said at least one linkhead unit further comprises a hanger channel extending along a lower edge of said linkhead unit, said hanger channel adapted to support thereon a plurality of office accessories.

* * * * *